E. V. W. Griffith.
Potato-Digger.

Nº 72289. Patented Dec. 17, 1867.

2 Sheets
Sheet 2

Witnesses                                                   Inventor

United States Patent Office.

EBENEZER V. W. GRIFFITH, OF UTICA, NEW YORK.

Letters Patent No. 72,289, dated December 17, 1867.

---

IMPROVEMENT IN POTATO-DIGGER.

---

*The Schedule referred to in these Letters Patent and making part of the same.*

---

TO ALL WHOM IT MAY CONCERN:

Be it known that I, EBENEZER V. W. GRIFFITH, of Utica, Oneida county, New York, have invented a new and useful Automatic Potato-Digger.

The nature of my invention consists in so constructing and arranging the parts that the fork is run under the hill and then raised and the earth and potatoes cast upon a screen which is kept constantly vibrating, by means of which the earth and potatoes are separated, and they are spread upon the ground to dry before gathering; and I do hereby declare that the following is a full, clear, and exact description of my said invention, and of the mode of operation of the same, reference being had to the annexed drawings, making a part of this specification, in which—

Figure 1 is a plan of the machine,

A A are the running-wheels; $A^1$ is the bent axle; B B, the front part of the frame; $B^1 B^1$, the rear part of the frame; C, a curved bar connecting the front and rear parts; D is the fork; $D^1$, a long bent lever on one side of the fork; $D^2$, a short lever on the opposite side; $D^3 D^3$, stops on B B, to prevent the fork going too deep; E, a spurred wheel on the hub of one of the large wheels A; F, a smaller spurred wheel, having bearings in the frame $B^1$; G is a disk on the axis of F; $G^1$ is a pin in the face of G, to operate the lever $D^1$; H is the screen; $H^1 H^1$, straps to hold the screen to the axle $A^1$; I I, small wheels supporting the rear end of the frame and screen; K K, flies for vibrating the screen; L, the pole or tongue; M, the driver's seat; N, a catch for holding up the fork when not working.

Figure 2:
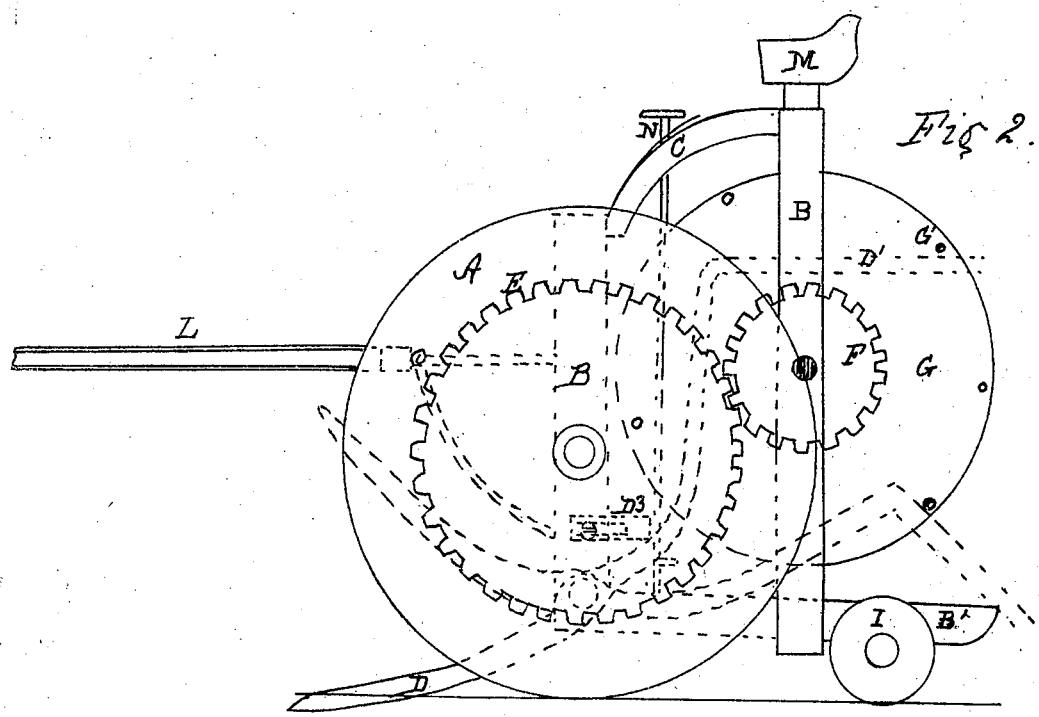
Figure 2 is a side view thereof.
Figure 3:
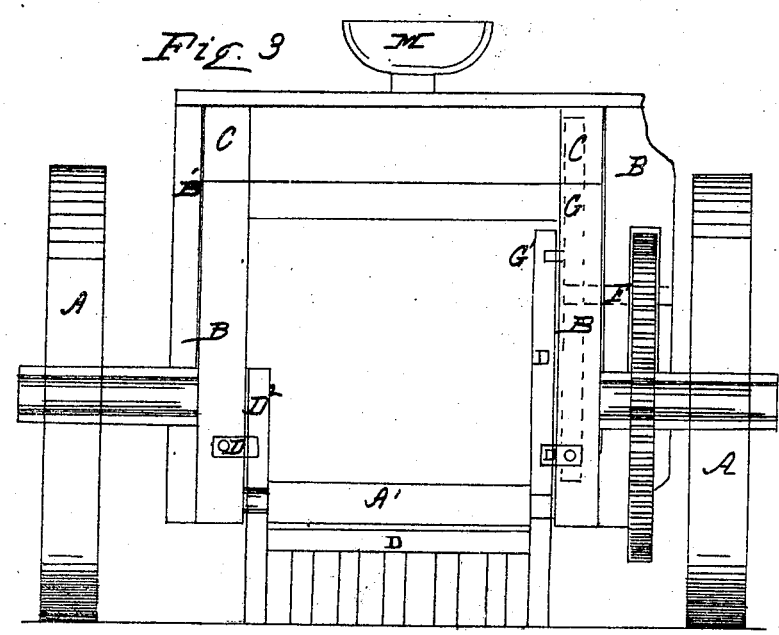
Figure 3 is a front view.

The wheels A A carry the front of the machine, and the small wheels I I support the rear end of the frame $B^1 B^1$ as well as the screen H. The axle $A^1$ of the large wheels is bent down, to allow the fork D and screen H to be as near to the surface of the ground as convenient. The frame B B, $B^1 B^1$, and C, may be of wood, and of any convenient form, to support the gearing for operating the fork. The head of the fork D has bearings on the axle $A^1$, and there is a long bent lever, in the form substantially as represented in fig. 2, on one side of the fork, by means of which it is raised, and its load of earth and potatoes cast upon the screen behind. On the other side of the fork D is a short and slightly curved lever, $D^2$. This lever $D^2$ and the lower end of $D^1$ serve, in connection with the stops $D^3 D^3$ on the front frame B B, to regulate the depth to which the fork may go. On the hub of one of the large wheels A is attached a spurred wheel, E, and gearing into it is a smaller spurred wheel, F, having its bearings in the frame $B^1$, and on the inner end of its axis is the disk G carrying the pin $G^1$, for operating the lever $D^1$. The screen H is formed of a series of longitudinal ribs, connected at the axle $A^1$ by a head-bar, which is attached to the bent axle by straps $H^1 H^1$ in such manner as to allow an up-and-down motion to the rear of the screen. The rear end of the screen is supported by the axle of the small wheels I I, which axle turns with the wheels, and has two flies, K K, on opposite sides, which flies may be formed of stout iron rods, or the like. The flies operate as eccentrics, and as the wheels rotate, the flies cause the rear end of the screen to rise and fall. This causes the potatoes to separate from the earth, and the rear end of the screen being lower than the front, they are spread on the ground behind to dry before gathering. The pole or tongue may be attached to the front frame, and on the top of the frame may be placed a seat for the driver. Two horses are used, and one hill in a row is operated on at a time. To work well, the hills should be at equal distances apart.

The operation is as follows: The machine passes over the row, a horse on each side. The weight of the fork brings its point to the ground as the machine moves forward. The tendency of the fork is to run into the ground, but this is controlled and regulated by the stops $D^3 D^3$. By the time the fork has passed under the hill, the pin $G^1$ on the face of the disk G has turned round and presses on the upper end of the lever $D^1$, which causes the fork with its load to rise, and the whole is thrown back on the screen H. By this time the pin $G^1$ has passed over the straight arm of the lever and reached the curve or bend, when the lever, being freed from the pressure of the pin, allows the fork instantly to fall down and enter under the next hill, and so on. While the machine is moving, the flies strike alternately the ribs of the screen, which cause them to rise and fall suddenly. This breaks the earth and causes it to sift through the screen, while the potatoes will roll off behind.

When the machine is moving to or from the field, the catch N may be turned on to the lever $D^1$, which will hold up the fork. The disk G has a series of holes near its periphery, to which the pin $G^1$ may be shifted at pleasure, to start the machine right or to accommodate it to the work.

Having thus described my invention, what I claim as new, and desire to secure by Letters Patent, is—

1. The fork D, the bent lever $D^1$, and the pin $G^1$, or their equivalents, in combination, for the uses and purposes mentioned.

2. The fork D, operated by the lever $D^1$ and pin $G^1$, in combination with the screen H, substantially as described, and for the uses and purposes mentioned.

3. The fork D and the bent axle $A^1$ and lever $D^1$ in combination, for the uses and purposes mentioned.

4. Operating the fork automatically by means of the gearing E and F and the pin $G^1$, substantially as described, and for the uses and purposes mentioned.

EBENEZER V. W. GRIFFITH.

Witnesses:
E. E. ROBERTS,
JOHN G. CROCKER.